(12) United States Patent
Hu et al.

(10) Patent No.: US 9,387,997 B2
(45) Date of Patent: Jul. 12, 2016

(54) PIPELINES AND CONVEYING METHODS

(75) Inventors: Lishun Hu, Pudong (CN); Wei Chen, Pudong (CN); Jing Lv, Pudong (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 667 days.

(21) Appl. No.: 13/253,104

(22) Filed: Oct. 5, 2011

(65) Prior Publication Data

US 2012/0111418 A1    May 10, 2012

(51) Int. Cl.
*B65G 53/04* (2006.01)
*B65G 53/52* (2006.01)
*F16L 41/02* (2006.01)

(52) U.S. Cl.
CPC .............. *B65G 53/523* (2013.01); *F16L 41/021* (2013.01); *Y10T 137/0396* (2015.04); *Y10T 137/8593* (2015.04)

(58) Field of Classification Search
USPC ............. 406/92, 144, 46, 89, 90, 91, 93, 181; 138/114, 116, 117
See application file for complete search history.

(56) References Cited

U.S. PATENT DOCUMENTS

| | | | |
|---|---|---|---|
| 4,116,491 A * | 9/1978 | Ply | 406/89 |
| 4,183,702 A * | 1/1980 | Bonnel | 406/56 |
| 4,220,426 A * | 9/1980 | Ply | 406/89 |
| 4,299,683 A * | 11/1981 | Adorno et al. | 204/246 |
| 4,315,644 A | 2/1982 | Jansing | |
| 4,381,898 A * | 5/1983 | Rotolico et al. | 406/118 |
| 4,440,712 A * | 4/1984 | Imgram | 264/209.5 |
| 4,449,853 A * | 5/1984 | Mennella et al. | 405/184 |
| 4,551,041 A | 11/1985 | Coon et al. | |
| 4,775,267 A * | 10/1988 | Yamamoto | 406/50 |
| 4,893,966 A * | 1/1990 | Roehl | 406/127 |
| 4,928,739 A * | 5/1990 | Teubert | 141/5 |
| 4,946,317 A | 8/1990 | Liu et al. | |
| 4,984,827 A | 1/1991 | Peppel et al. | |
| 5,018,910 A * | 5/1991 | Weiss | 406/144 |
| 6,227,768 B1 * | 5/2001 | Higuchi et al. | 406/89 |
| 6,343,417 B1 | 2/2002 | Bonny et al. | |
| 6,609,871 B2 * | 8/2003 | Pfeiffer et al. | 414/328 |

(Continued)

FOREIGN PATENT DOCUMENTS

| | | |
|---|---|---|
| CN | 200510042918.3 | 7/2005 |
| CN | 200520079041.0 | 7/2005 |

(Continued)

OTHER PUBLICATIONS

Hongqing Tang, "The Evaluation of Shell Coal Gasification Process and its Ways of Improvement", Coal Chemical Industry, 2005, No, 6, pp. 9-14.

(Continued)

*Primary Examiner* — Joseph Dillon, Jr.
(74) *Attorney, Agent, or Firm* — GE Global Patent Operation; Peter T. DiMauro

(57) ABSTRACT

A pipeline for conveyance of a multiphase fluid is provided. The pipeline comprises a containment element and a tubular element. The containment element defines a cavity and an inlet in fluid communication with the cavity. The tubular element passes through the containment element and with a portion thereof disposed within the cavity to be in fluid communication with the inlet of the containment element. A gasification system for gasification a solid powder and a method for conveyance of a multiphase fluid are also presented.

5 Claims, 3 Drawing Sheets

(56) References Cited

U.S. PATENT DOCUMENTS

| | | | |
|---|---|---|---|
| 6,719,500 B2* | 4/2004 | Pfeiffer et al. | 406/91 |
| 6,722,822 B2* | 4/2004 | Pfeiffer et al. | 406/164 |
| 6,749,373 B2* | 6/2004 | Von Geldern et al. | 406/23 |
| 6,764,253 B1* | 7/2004 | Pfeiffer | 406/11 |
| 6,848,464 B2* | 2/2005 | Ransom | 137/312 |
| 7,137,759 B1* | 11/2006 | Ambs | 406/55 |
| 7,144,204 B2* | 12/2006 | Hilgraf | 406/95 |
| 7,329,071 B2* | 2/2008 | Sonnichsen | 406/89 |
| 7,347,649 B2* | 3/2008 | Duerr et al. | 406/49 |
| 7,422,622 B2 | 9/2008 | Leigh | |
| 8,425,159 B2* | 4/2013 | Roumieu et al. | 406/89 |
| 8,491,226 B2* | 7/2013 | Kleineidam et al. | 406/50 |
| 8,651,326 B2* | 2/2014 | Pollard et al. | 221/278 |
| 2004/0136792 A1* | 7/2004 | Pfeiffer et al. | 406/181 |
| 2005/0042041 A1* | 2/2005 | Hilgraf | 406/92 |
| 2006/0193704 A1* | 8/2006 | Simontacchi | 406/88 |
| 2007/0110525 A1* | 5/2007 | Karlsen et al. | 406/89 |
| 2008/0031697 A1 | 2/2008 | Berggren | |
| 2009/0084457 A1* | 4/2009 | Tsuchie et al. | 138/104 |
| 2009/0304461 A1* | 12/2009 | Strohschein | 406/11 |
| 2010/0015311 A1* | 1/2010 | Stousland et al. | 426/509 |
| 2010/0132557 A1 | 6/2010 | Dries et al. | |
| 2010/0189518 A1* | 7/2010 | Roumieu et al. | 406/89 |
| 2010/0282353 A1* | 11/2010 | Baylot et al. | 138/114 |
| 2012/0230778 A1* | 9/2012 | Petit et al. | 406/89 |
| 2013/0025875 A1* | 1/2013 | Critsinelis et al. | 166/372 |
| 2013/0233431 A1* | 9/2013 | Tanaka et al. | 138/114 |
| 2013/0233432 A1* | 9/2013 | Tanaka et al. | 138/114 |
| 2014/0202548 A1* | 7/2014 | Geerlings et al. | 137/1 |

FOREIGN PATENT DOCUMENTS

| | | |
|---|---|---|
| CN | 200610104483.5 | 7/2006 |
| CN | 200620079543.8 | 8/2006 |
| CN | 200620046368.2 | 9/2006 |
| CN | 101080355 A | 11/2007 |
| CN | 201408054 Y | 2/2010 |

OTHER PUBLICATIONS

Jia-ming Wang. "Technology of Shell Coal Gasification and its Application in Our Country", Guangzhou Chemical. 2006, vol. 34, No. 5, pp. 19-22.

Shoujian, Jiang. "Discussion on Design of Key Devices of Shell Coal Gasification", Gas Purification, 2003, vol. 3, No. 5, pp. 11-13.

Xue-feng Zheng, "Design for Conveying Piping of SCGP Pulverized Coal", Chemical Fertilizer Design, 2006, vol. 44, 6, pp. 31-35.

Yuelan Fang et al., "Comparative Analysis of Texaco and Shell Coal Gasification Processes", Journal of Chemical Industry & Engineering. 2007, vol. 28, No. 6, pp. 57-60.

Zhaobin Ren et al., Technical Evaluation of Shell Pulverized Coal Pressurized Gasification and New Coal—Water Slurry Pressurized Gasification, Henan Chemical Industry, 2004 No. 2, pp. 40-44.

Zhiyuan Li, et al., "Shell Coal Gasification Technology", Chemical industry and Engineering Process, 2003, vol. 22, No. 9, pp. 998-1000.

Unofficial English translation of CN Office Action dated Feb. 12, 2014 from corresponding CN Application No. 201010551175.3.

Unofficial English Translation of Chinese Office Action issued in connection with corresponding CN Application No. 201010551175.3 on Oct. 10, 2013.

* cited by examiner

PIPELINES AND CONVEYING METHODS

BACKGROUND

Embodiments of the invention relate generally to pipelines and conveying methods. More particularly, embodiments of the invention relate to pipelines and methods for conveyance of a multiphase fluid such as a gas-solid mixture.

A multiphase fluid, such as a gas-solid mixture exists in many areas of technology such as gasification of carbonaceous fuels. Gasification is a process that enables the conversion of carbonaceous fuels, such as coal into a combustible gas, such as a synthesis gas. Generally, gasification processes include pneumatic conveyance of carbonaceous fuels into gasifiers along with a controlled and/or limited amount of oxygen and other steams.

In some conventional gasification systems employing pneumatic conveyance technologies, such gasification systems typically comprise storage tanks, gasifiers and a plurality of pipelines in fluid communication with the respective storage tanks and the gasifiers. During operation, carbonaceous fuels and carrier gases are introduced into the storage tanks to form a gas-solid mixture in the storage tanks for conveyance through the pipeline into the respective gasifiers.

However, such tubular elements may be abraded during conveyance of the gas-solid mixture. Typically, such pipelines usually have bended portions so that during the conveyance of the gas-solid mixture, abrasion may occur in the bended portions of the pipelines more severely. As a result, the lifetime of such pipelines may be shortened due to the abrasion of the pipelines.

There have been attempts to prevent the abrasion of the pipelines. For example, the pipelines are designed to have relatively thicker walls and/or to have T-shaped bended portions. However, the pipelines having thicker walls may increase manufacturing cost. The T-shaped bended portions have blind spots resulting in deposition of the carbonaceous fuels, which is disadvantageous to the flow of the gas-solid mixture in the pipelines.

Therefore, there is a need for new and improved pipelines and methods for conveyance of a multiphase fluid such as a gas-solid mixture.

BRIEF DESCRIPTION

A pipeline for conveyance of a multiphase fluid is provided. The pipeline comprises a containment element and a tubular element. The containment element defines a cavity and an inlet in fluid communication with the cavity. The tubular element passes through the containment element and a portion thereof is disposed within the cavity so that the inlet of the containment element is in fluid communication with an interior of the tubular element through the portion of the tubular element disposed within the cavity.

A gasification system for gasification a solid powder is provided. The gasification system comprises a storage tank and a gasifier. The gasification system further comprises a pipeline comprises a tubular element and a containment element. The tubular element is in fluid communication with the storage tank and the gasifier. The containment element defines a cavity to accommodate a portion of the tubular element and an inlet in fluid communication with the cavity and an interior of the tubular element through the portion of the tubular element accommodated within the cavity.

An embodiment further provides a method for conveying a multiphase fluid. The method comprises conveying a multiphase fluid through a tubular element of a pipeline. Wherein the pipeline comprises a containment element defining a cavity and an inlet in fluid communication with the cavity, and the tubular element passes through the containment element and a portion thereof is disposed within the cavity so that the inlet of the containment element is in fluid communication with the tubular element through the portion of the tubular element disposed within the cavity. The method further comprises introducing a gas into the containment element through the inlet thereof to increase a pressure in the containment element to pressurize the gas into the tubular element so as to form a gas film between the multiphase fluid and the portion of the tubular element disposed within the cavity.

BRIEF DESCRIPTION OF THE DRAWINGS

The above and other aspects, features, and advantages of the present disclosure will become more apparent in light of the following detailed description when taken in conjunction with the accompanying drawings in which.

DETAILED DESCRIPTION OF THE DISCLOSURE

Embodiments of the present disclosure will be described hereinbelow with reference to the accompanying drawings. In the following description, well-known functions or constructions are not described in detail to avoid obscuring the disclosure in unnecessary detail.

Figure 1:
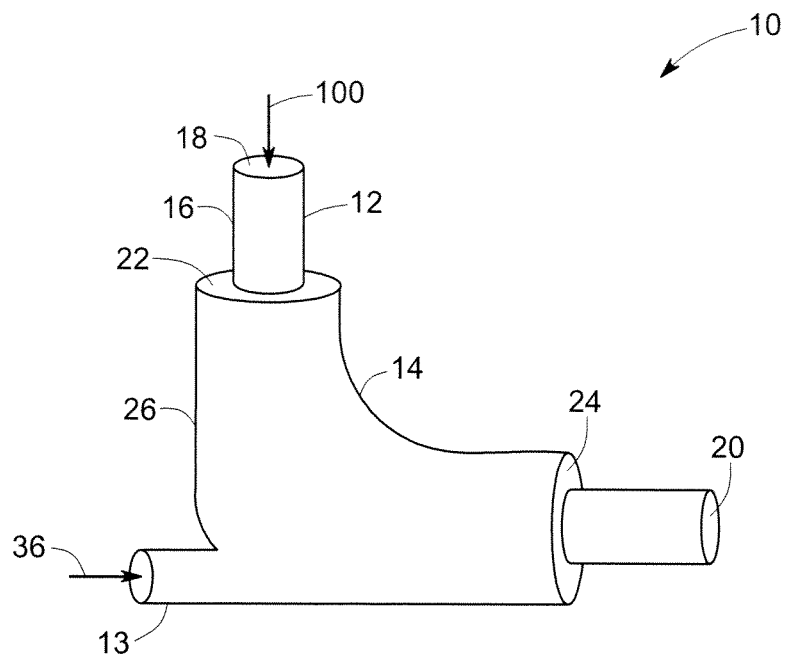
FIG. 1 is a perspective view of a pipeline in accordance with one embodiment of the invention.

FIG. 1 illustrates a perspective view of a pipeline 10 in accordance with one embodiment of the invention. In embodiments of the invention, the pipeline 10 is configured to convey a multiphase fluid 100. The multiphase fluid 100 may comprise materials with two or more phases, for example, a gas-solid mixture or a liquid-solid mixture. In non-limiting examples, the multiphase fluid 100 may comprise a gas-solid mixture mixed by a gas and a solid powder with desired size distribution.

As illustrated in FIG. 1, the pipeline 10 comprises a tubular element 12 and a containment element 14 disposed around at least a portion of the tubular element 12. In some embodiments, the tubular element 12 may comprise a tube and is configured to receive and convey the multiphase fluid 100, such as a gas-solid mixture to subsequent apparatuses for further processing, for example, to a gasifier or a blast furnace based on different applications.

For the illustrated arrangement, the tubular element 12 comprises a sidewall 16, and comprises an inlet 18 and an outlet 20 defined at two ends of the sidewall 16 for receiving and discharging the multiphase fluid 100, respectively. The containment element 14 comprises two end portions 22, 24 and a sidewall 26 connected to the two end portions 22, 24 so as to define a cavity 11 (shown in FIG. 2) together.

In some examples, the sidewall 16 of the tubular element 12 may comprise a circular cross section. Similar to the sidewall 16 of the tubular element 12, the sidewall 26 of the containment element 14 may also comprise a circular cross section. In other examples, the sidewall 16 and/or the sidewall 26 may comprise cross sections having other shapes, such as polygonal shapes.

As depicted in FIG. 1, the tubular element 12 passes through the cavity 11 via the end portions 22, 24 of the containment element 14. In some examples, the tubular element 12 may be coaxial with the containment element 14. Alternatively, the tubular element 12 may not be coaxial with the containment element 14. Various techniques may be employed to assemble the tubular element 12 and the containment element 14 together. For example, the sidewall 16 of the tubular element 12 and the respective end portions 22, 24 of the containment element 14 may be welded together. In other examples, flanges (not shown) may be used to removably attach the containment element 14 to the tubular element 12.

In some examples, at least a portion of the tubular element 12 may be received into the containment element 14 and a space 28 (shown in FIG. 2) may be defined between the sidewalls 16 and 26. In some applications, the inlet 18 and the outlet 20 may extend beyond the containment element 14. Alternatively, the inlet 18 and the outlet 20 may not extend outside of the containment element 14, for example, the inlet 18 and/or the outlet 20 may be in flush with the respective end portions 22, 24 of the containment element 14.

Figure 2:
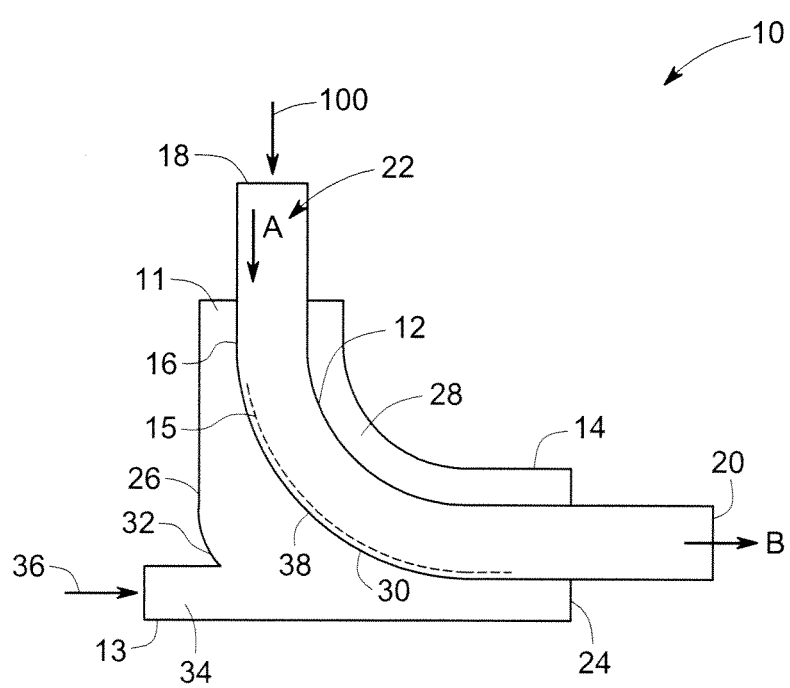
FIGS. 2-4 are schematic cross section views of the pipeline in accordance with various embodiments of the invention.
Figure 3:
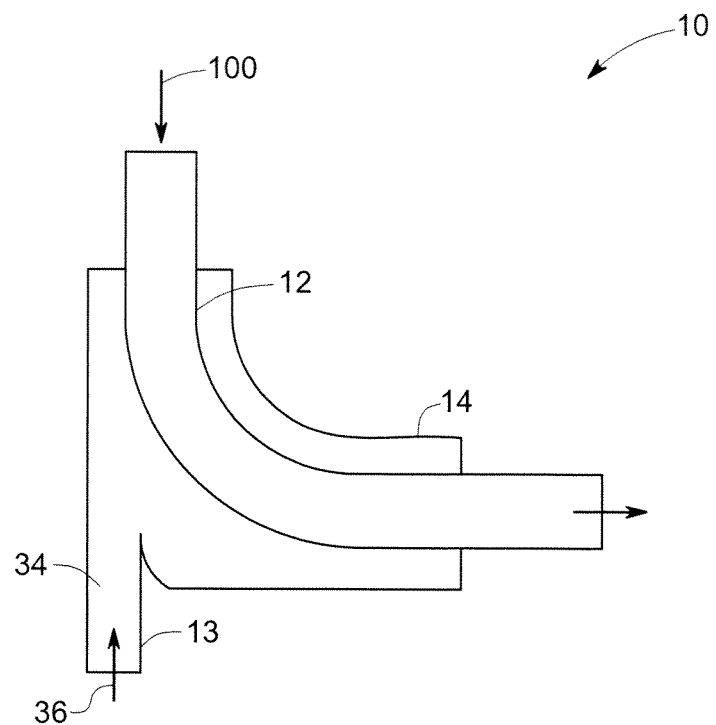
Figure 4:
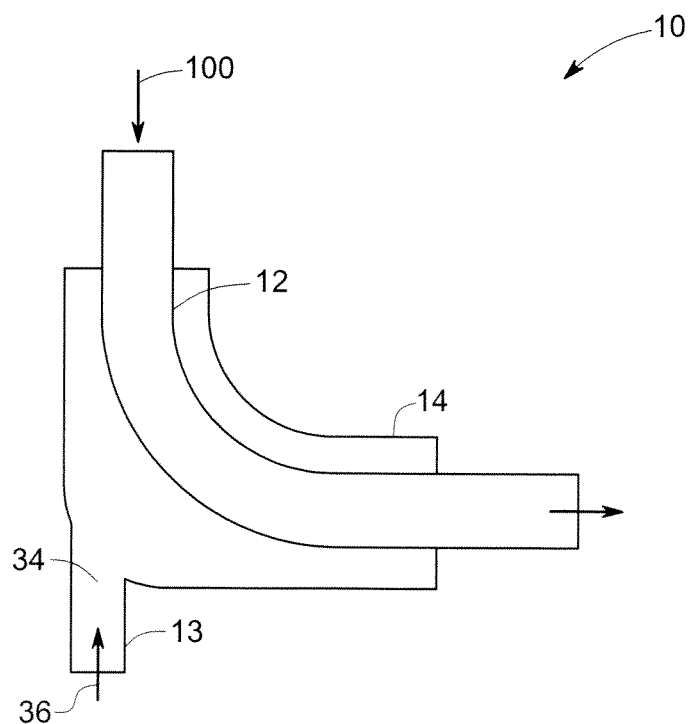

FIGS. 2-4 illustrate schematic cross section views of the pipeline 10 in accordance with various embodiments of the invention. As illustrated in FIGS. 1-2, the tubular element 12 further comprises a bended portion (elbow) 30 in fluid communication with the inlet 18 and the outlet 20, which may indicate that the multiphase fluid 100 may be introduced into the tubular element 12 through the inlet 18 along a first direction 'A' and may be discharged out of the tubular element 12 through the outlet 20 along a second direction 'B' different from the first direction 'A'. In some examples, an angle (not shown) between the first direction 'A' and the second direction 'B' may be in a range of larger than zero degree and smaller than 180 degrees, which may also indicate a bended angle (not shown) of the bended portion 30 of the tubular element 12 may be in the range of larger than zero degree and smaller than 180 degrees. In one non-limiting example, the bended angle of the tubular element 12 is about 90 degrees.

For some arrangements, at least a portion of the bended portion 30 may be disposed within the cavity 11 of the containment element 14. In some examples, the tubular element 12 may not comprise the bended portion 30 or the bended portion 30 may not be disposed within the cavity 11, so that a straight portion (not shown) of the tubular element 12 may pass through the containment element 14. Similarly, the containment element 14 may or may not be formed with a bended portion 32.

In some embodiments, at least a portion of the tubular element 12 may comprise one or more porous materials. The one or more porous materials may include one or more metals or one or more metal alloys, or other suitable porous materials. Non-limiting examples of the one or more metals include one or more of stainless steels, nickel, copper and titanium. Non-limiting examples of the one or more metal alloys include one or more of titanium alloy and copper alloy. In non-limiting examples, the containment element 14 may comprise metal materials, such as stainless steels or other suitable materials sustainable for a higher pressure.

In some examples, the containment element 14 may further comprise an inlet 34 in fluid communication with the cavity 11 so as to introduce a gas 36 into the space 28 to increase a pressure in the containment element 14 to a desired level. A branch pipeline 13 is in fluid communication with the containment element 14 via the inlet 34. Since the tubular element 12 is formed with the porous materials, the gas 36 from the inlet 24 through the branch pipeline 13 may be in fluid communication with an interior of the tubular element 12 via the porous sidewall 16.

In some examples, the desired pressure in the cavity 11 may be higher than the pressure in the tubular element 12, so that the gas 36 from the inlet 34 may penetrate into the tubular element 12 received in the containment element 14 to form a gas film 15 between the multiphase fluid 100 and the sidewall 16 of the tubular element 12 so as to prevent the multiphase fluid 100 from abrading the tubular element 12. In some applications, the pressure in the tubular element 12 may be in a range of 1-10 Mpa. The desired pressure in the space 28 may be controlled based on the flow of the gas into the containment element 14.

Thus, during operation, the multiphase fluid 100 are introduced into the tubular element 12. Meanwhile, the gas 36 is introduced into the containment element 14 via the inlet 34 to increase the pressure therein, which is higher than that in the tubular element 12, so as to produce a pressure difference between the containment element 14 and the tubular element 12. Due to the pressure difference, the gas 36 in the containment element 14 enters into the tubular element 12 via the sidewall 16 of the tubular element 12 to form the gas film between the multiphase fluid 100 and the sidewall 16 to prevent the multiphase fluid 100 from abrading the tubular element 12. The step of introducing the multiphase fluid 100 into the tubular element 12 may be performed prior to, simultaneously with, or after the step of introducing the gas 36 into the containment element 14.

It should be noted that the arrangement in FIG. 1 is merely illustrative. The portion(s) of the tubular element 12 may be determined to comprise the one or more porous materials based on different applications, such as different abrasion situations. In one example, the tubular element 12 disposed within the cavity 26 may comprise the one or more porous materials. Further, when the tubular element 12 comprises the bended portion 30, the abrasion may occur in a lower part 38 of the bended portion 30 severely. Accordingly, at least a portion of the bended portion 18 disposed within the cavity 20, such as the lower part 38 thereof comprises the one or more porous materials, so that, during operation, the gas 36 enters into the tubular element 12 and forms the gas film 15 near the bended portion 30 to avoid abrasion of the bended portion 30.

For the illustrated arrangement, the inlet 34 is defined on the bended portion 32 of the containment element 14 and is adjacent to the lower part 38 of the bended portion 30 so as to facilitate introduction of the gas 36 into the tubular element 12 from the lower part 38 of the bended portion 30 to protect the bended portion 30. In certain applications, the inlet 34 may be defined at other positions on the containment element 14. For example, the inlet 34 may be defined away from the bended portion 30 or may be defined at the end portions 22 and/or 24.

In some examples, the gas 36 introduced into the containment element 14 may be a cocurrent flow with the flow of the multiphase fluid 100 in the tubular element 12 and a lower part (not labeled) of the branch tubular element 13 may be in flush with a lower part (not labeled) of the containment element 14, as shown in FIG. 1. In certain applications, the lower part of the branch tubular element 13 defined on the bended portion 32 may not be in flush with the lower part of the containment element 14.

In other examples, the gas 36 introduced into the containment element 14 may be anti-current with the flow of the multiphase fluid 100 in the tubular element 12, as illustrated in FIGS. 3-4. As used herein, the term "cocurrent flow" indicates a flow direction (not shown) of the gas 36 flowing into the containment element 14 through the inlet 34 may be substantially the same as a flow direction of at least a portion of the multiphase fluid 100 in the tubular element 12. The term "anti-current flow" indicates a flow direction of the gas 36 flowing into the containment element 14 through the inlet 34 may be opposite to the flow direction of at least a portion of the multiphase fluid 100 in the tubular element 12.

The arrangements in FIGS. 2-4 are similar and the arrangements in FIGS. 2-4 differ in the positions of the inlet 34 defined on the containment element 14. The arrangements in FIGS. 3-4 differ in that, in FIG. 3, an outer part (not labeled) of the branch tubular element 13 may be flush with one side (not labeled) of the sidewall 26 of the containment element 14, and in FIG. 4, the outer part of the branch tubular element 13 may not be flush with the one side of the sidewall 26 of the containment element 14.

For the arrangements show in FIGS. 1-4, in some examples, if without the inlet 34 defined on the containment element 14, the cavity 11 of the containment element 14 may be closed to facilitate the increase of the pressure therein so as to pressurize the gas 36 to penetrate into and protect the tubular element 12. In non-limiting examples, the quantity of the gas 36 introduced into the containment 14 may be less than 20% of the gas quantity in the tubular element 12.

In other examples, the containment element 14 may not be closed besides the inlet 24, for example, the containment element 14 may define one or more outlets (not shown) with certain sizes so that the pressure may be controlled by adjust the flow of the gas 36 from the inlet 34 and from the one or more outlets of the containment element 14. Additionally, although a single sidewall 16, a single sidewall 26, a single bended portion 30, a single inlet 34, and a single tubular element 12 are employed, more than one sidewalls 16, more than one sidewalls 26, more than one bended portion 30, more than one inlet 34 and/or more than one tubular element 12 may also be employed. It should be noted that "a" and "an" used to modify uncountable term herein are intended to specially indicate the term is first mentioned in individual sections rather than limit the term's amount.

Figure 5:
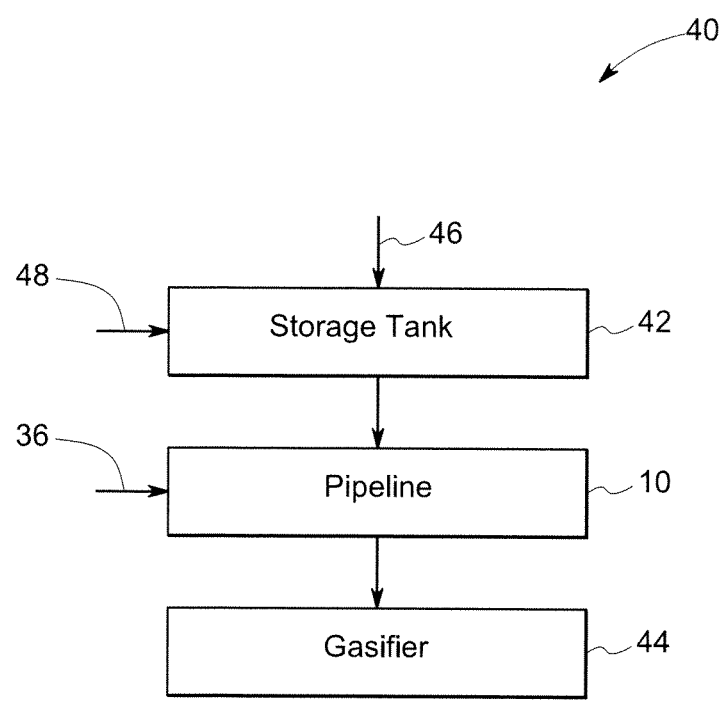
FIG. 5 is a schematic diagram of a gasification process in accordance with one embodiment of the invention.

For some arrangements, the pipeline 10 may be used in many areas of technology based on various applications. FIG. 5 illustrates a schematic diagram of a gasification process 40 including the pipeline 10. The multiphase fluid 100 may comprise the gas-solid mixture mixed by a gas and a solid power. The solid powder in the gas-solid mixture may comprise carbonaceous fuels. Non-limiting examples of the carbonaceous fuels include coal, bituminous, soot, biomass, petroleum coke or combinations thereof.

As illustrated in FIG. 5, the gasification system 40 comprises a storage tank 42, a plurality of gas pipelines (not shown), a gasifier 44, and the pipeline 10 disposed between and in fluid communication with the storage tank 42 and the gasifier 44. In some embodiments, the storage tank 42 is configured to receive a solid powder 46 through a conveyance such as a pipeline (not shown) via a feeder (not shown). The gas pipelines are in fluid communication with the storage tank 42 to introduce a gas 48 into the storage tank 42 to mix with the solid powder 46 to form the gas-solid mixture.

During operation, the solid powder 46 is introduced into the storage tank 42 from a solid powder source (not shown) and the gas (a first gas) 48 is also introduced into the storage tank 46 through the gas pipelines to form the gas-solid mixture and increase the pressure in the storage tank 42. Then, the gas solid mixture is conveyed to pass through the tubular element 12 (shown in FIGS. 1-4) of pipeline 10. Meanwhile, the gas (a second gas) 36 is introduced into the containment element 14 to increase the pressure therein so as to form the pressure difference between the containment element 14 and the tubular element 12 of the pipeline 10. For some arrangements, the gas 36 may be the same as or different from the gas 48. Non-limiting examples of the gas 48 and/or the gas 36 include one or more of carbon dioxide, inert gas such as nitrogen, or other suitable gases.

During the conveyance, the gas 36 penetrates into the tubular element 12 to form a gas film between the solid power 46 and the sidewall 16 of the tubular element 12 to prevent the tubular element 12 from abrading. Finally, the gas-solid mixture is introduced into the gasifier 44 for gasification.

In some applications, the pipeline 10 may be directly connected to the storage tank 42 and/or the gasifier 44 via the tubular element 12. In certain applications, the pipeline 10 may function as an adapter, so that the tubular element 12 of the pipeline 10 may be connected to the storage tank 42 and/or the gasifier 44 in virtue of additional tubular elements (not labeled) disposed between the tubular element 12 and the respective storage tank 42 and the gasifier 44.

In embodiments of the invention, the pipeline 10 employs the containment element to accommodate the porous tubular element passing through the containment element. During the conveyance of the multiphase fluid through the porous tubular element, the gas in the containment element may enter into the tubular element so as to form a gas film to prevent the tubular element from abrasion. In certain examples, the porous tubular element may comprise one or more bended portions, which may be abraded more severely during the conveyance. With the deployment of the pipeline, the one or more bended portions may be prevented from abrasion. Thus, the lifetime of the tubular element for conveyance of the multiphase fluid may be prolonged. In addition, the structure of the pipeline may be relative simpler, the manufacturing cost may be reduced.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A gasification system for gasification of a solid powder, comprising:
    a storage tank configured to receive a solid powder and a first gas to form a gas-solid mixture in the storage tank;
    a pipeline, wherein the gas-solid mixture is conveyed from the storage tank into a tubular element of said pipeline; and
    a gasifier, wherein the gas-solid mixture is introduced from the pipeline into the gasifier for gasification of the gas solid mixture; wherein the pipeline comprises:
        the tubular element in fluid communication with the storage tank and the gasifier,
        a containment element defining a cavity to accommodate a portion of the tubular element, and
        an inlet of containment element in fluid communication with the cavity and with an interior of the tubular element through the portion of the tubular element accommodation within the cavity,
        wherein the tubular element comprises a bended portion disposed within the cavity of the containment element, and wherein at least a portion of a sidewall of the tubular element is a porous sidewall;

wherein the inlet of the containment element is configured to introduce gas into the cavity to increase a pressure in the containment element so that said gas can be pressurized into the tubular element through the porous sidewall;

wherein the tubular element of the pipeline is configured to convey the gas-solid mixture from the storage tank into the gasifier for gasification of the gas-solid mixture.

2. The gasification system of claim 1, wherein the tubular element passes through the containment element, and wherein an inlet and an outlet of the tubular element extend outside of the containment element.

3. The gasification system of claim 1, wherein the tubular element is coaxial with the containment element.

4. The gasification system of claim 1, wherein the portion of the tubular element accommodated within the cavity is porous so that the inlet is in fluid communication with the tubular element.

5. The gasification system of claim 1, wherein the pipeline comprises an adapter with additional tubular elements in fluid communication with the adapter and the respective storage tank and the gasifier.

* * * * *